United States Patent [19]
Cullen

[11] Patent Number: 5,857,313
[45] Date of Patent: Jan. 12, 1999

[54] DENSITY CONTROL MEANS FOR AN AGRICULTURAL FEED BAGGING MACHINE INCLUDING AN ADJUSTABLE, BEVELED PRESS PLATE

[75] Inventor: Steven R. Cullen, Astoria, Oreg.

[73] Assignee: Versa Corp., Astoria, Oreg.

[21] Appl. No.: 2,701

[22] Filed: Jan. 5, 1998

Related U.S. Application Data

[63] Continuation-in-part of Ser. No. 876,352, Jun. 16, 1997, Pat. No. 5,775,069, which is a continuation of Ser. No. 762,195, Dec. 9, 1996, Pat. No. 5,671,594, which is a continuation of Ser. No. 448,995, May 24, 1995, abandoned.

[51] Int. Cl.$^6$ .................................................. B65B 01/24
[52] U.S. Cl. ................. 53/567; 53/576; 53/255; 53/527; 53/529
[58] Field of Search ................................ 141/71, 74, 114, 141/286, 317, 339; 100/65, 66, 67, 100, 144, 212; 53/201, 255, 257, 260, 527, 529, 530, 551, 567, 576

[56] References Cited

U.S. PATENT DOCUMENTS

| | | | |
|---|---|---|---|
| 5,355,659 | 10/1994 | Cullen | 53/576 X |
| 5,377,481 | 1/1995 | Sibley et al. | 100/145 X |
| 5,419,102 | 5/1995 | Inman et al. | 53/567 |
| 5,456,075 | 10/1995 | Meijer | 100/189 X |
| 5,517,806 | 5/1996 | Cullen | 53/567 X |
| 5,566,532 | 10/1996 | Inman et al. | 53/576 X |
| 5,671,594 | 9/1997 | Cullen | 53/567 |

*Primary Examiner*—Daniel B. Moon
*Attorney, Agent, or Firm*—Zarley, McKee, Thomte, Voorhees & Sease; Dennis L. Thomte

[57] ABSTRACT

An adjustable, beveled press plate is provided on an agricultural bagging machine rearwardly of the rotor thereof. There vertical adjustablity of the press plate enables the machine operator to more precisely control the density of the material being packed in an agricultural bag.

22 Claims, 2 Drawing Sheets

DENSITY CONTROL MEANS FOR AN AGRICULTURAL FEED BAGGING MACHINE INCLUDING AN ADJUSTABLE, BEVELED PRESS PLATE

CROSS-REFERENCE TO RELATED APPLICATION

This is a continuation-in-part application of application Ser. No. 08/876,352 filed Jun. 16,1997, entitled DENSITY CONTROL MEANS FOR AN AGRICULTURAL FEED BAGGING MACHINE, now U.S. Pat. No. 5,775,069 which is a continuation application of application Ser. No. 08/762, 195 filed Dec. 9, 1996, entitled DENSITY CONTROL MEANS FOR AN AGRICULTURAL FEED BAGGING MACHINE and which issued as U.S. Pat. No. 5,671,594 on Sep. 30, 1997, which is a continuation application of application Ser. No. 08/448,995 filed May 24, 1995, entitled DENSITY CONTROL MEANS FOR AN AGRICULTURAL FEED BAGGING MACHINE which has been abandoned.

BACKGROUND OF THE INVENTION

1. Field of the Invention

This invention relates to an agricultural feed bagging machine and more particularly to an agricultural feed bagging machine having a vertically adjustable, beveled press plate associated therewith to control the density of the material being packed in the bag without the need for a backstop and cable brakes.

2. Background Information

Agricultural feed bagging machines have been employed for several years to pack or bag silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor or the like which conveys the silage into a tunnel on which the bag is positioned so that the bag is filled. As silage is loaded into the bag, the bagging machine moves away from the filled end of the bag in a controlled fashion so as to achieve uniform compaction of the silage material within the bag. In U.S. Pat. No. 4,337,805, silage is forced by means of a rotor from the intake chamber of the machine through the output chamber of the machine and into the agricultural bag with a backstop structure yieldably engaging the closed end of the agricultural bag to resist the movement of the bagging machine away from the filled end of the agricultural bag as silage is forced into the bag. The structure of the '805 patent includes a pair of drums rotatably mounted on the bagging machine with a brake associated therewith for braking or resisting the rotation of the drum with a selected brake force. A cable is wrapped around the drum and is connected to the backstop.

Although the cable drum and backstop structure of the '805 patent and other similar machines do function generally satisfactorily, the cables, which are positioned on opposite sides of the bag, can create openings or holes in the bag which will adversely affect the fermentation process within the bag. A further disadvantage of the cable drum and backstop structure of the devices such as shown in the '805 patent is that the cables must be rewound after the filling of an individual bag. Yet another disadvantage of the cable drum and backstop structure of the machine such as disclosed in the '805 patent is that a dangerous condition exists should one of the cables break.

In an effort to overcome some of the disadvantages of machines such as disclosed in the '805 patent, an attempt was made in U.S. Pat. No. 4,621,666 to achieve the desired bagging operation while eliminating the need for the cable drum and backstop structure. In the '666 patent, the wheels on the bagging machine were braked to provide the desired resistance to the filling of the bag. Although the brake system of the '666 patent apparently met with some success, it is believed that machines such as disclosed in the '666 patent experience slippage difficulties in wet field conditions which adversely affect the bagging operation. It is also believed that the brake means alone on the bagging machine such as those disclosed in the '666 patent does not achieve the desired compaction of the silage material within the bag.

In applicant's U.S. Pat. No. 5,297,377, a bagging machine is described which has the capability of enabling the density of the silage material to be selectively controlled without the need of an elaborate braking system. In U.S. Pat. No. 5,297,377, a density control means was described which included a plurality of cables which were positioned in the flow of the silage material being bagged. In order to vary the density of the material in the machine of the '377 patent, more or less cables would be employed based on the material being packed. For example, corn silage flows easy and would require more cables while alfalfa packs hard and would use less cables.

In applicant's U.S. Pat. No. 5,425,220, a density control means is described which includes a pair of intersecting cables positioned in the flow of the silage material being bagged. In order to vary the density of the material in the machine of the '220 patent, the relationship of the intersecting or crisscrossing cables is varied. In applicant's U.S. Pat. No. 5,671,594, a fixed beveled press plate is disclosed for use with a density control cable. Although a density control means is disclosed in the above-identified patents of applicant, it is believed that the instant invention provides a significant advance in the art.

SUMMARY OF THE INVENTION

An agricultural feed bagging machine is disclosed which comprises a wheeled frame having rearward and forward ends. A tunnel is provided on the wheeled frame and has an intake end for receiving silage material and an output end adapted to receive the mouth of an agricultural bag. A hopper, conveyor or feed table is provided on the wheeled frame for receiving the silage material and is adapted to supply the same to a feed compression or compaction means such as a rotatable rotor which forces the silage into the tunnel and into the bag. The density control means of this invention comprises a U-shaped cable which extends rearwardly from the wheeled frame below the rotor. A hydraulic cylinder operated trolley arrangement is operatively connected to the U-shaped cable to change the spacing between the leg portions of the U-shaped cable. An adjustable, beveled press plate is positioned rearwardly of the rotor. The U-shaped cable may be omitted in most cases.

It is therefore a principal object of the invention to provide an improved agricultural feed bagging machine.

A further object of the invention is to provide an agricultural bagging machine having means at the output end of the tunnel for increasing the density of the silage material being forced through the tunnel into the bag.

Yet another object of the invention is to provide an agricultural bagging machine having an adjustable, beveled press plate located rearwardly of the rotor for guiding the material being packed upwardly and outwardly with respect thereto in varying amounts.

These and other objects will be apparent to those skilled in the art.

DESCRIPTION OF THE PREFERRED EMBODIMENT

Figure 1:
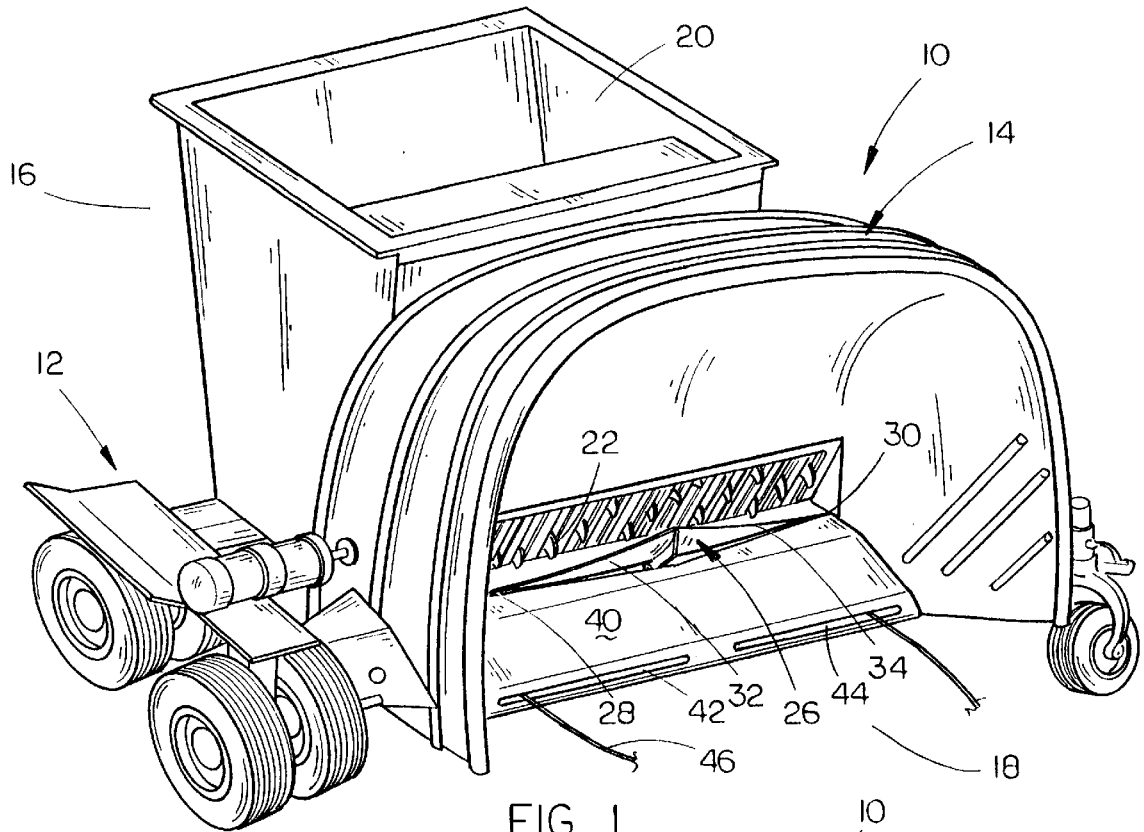
FIG. 1 is a rear perspective view of the agricultural bagging machine of this invention with the adjustable, beveled press plate in its raised position.

The numeral 10 refers generally to an agricultural bagging machine which is disclosed in U.S. Pat. No. 5,671,594, except for the adjustable, beveled press plate as will be described hereinafter.

Machine 10 includes a wheeled frame 12 having a tunnel 14 mounted thereon upon which is normally positioned the open mouth of a conventional agricultural bag. Although the preferred embodiment includes a wheeled frame, a non-wheeled frame could also be employed. For purposes of conciseness, the power means for driving the various components of the machine will not be disclosed, since the same does not form a part of the invention. The power means could be an engine mounted on the machine or a PTO shaft connected to a tractor PTO.

For purposes of description, the bagging machine 10 will be described as including a forward end 16 and a rearward end 18. Bagging machine 10 includes a hopper means 20 or other material receiving means, such as a feed table, conveyor, etc., at the forward end thereof which is adapted to receive the material to be bagged from a truck, wagon, etc. A horizontally disposed rotatable rotor 22 of conventional design is located at the lower end of the hopper means 20 for forcing the material to be bagged into the tunnel 14 and into the bag in conventional fashion. Although a horizontally disposed rotor is disclosed, it is possible that other types of material conveying or material compressing means could be employed such as augers, packers, etc.

Figure 3:
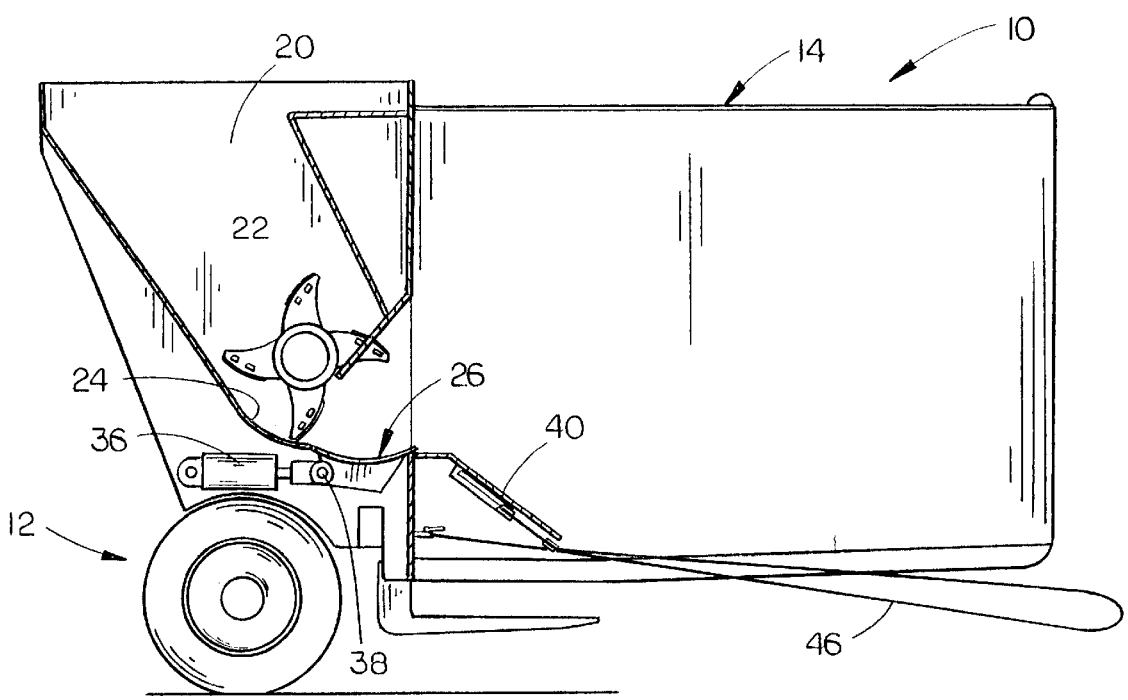
FIG. 3 is a partial longitudinal vertical sectional view of the bagging machine with the beveled press plate in its lowered position.
Figure 4:
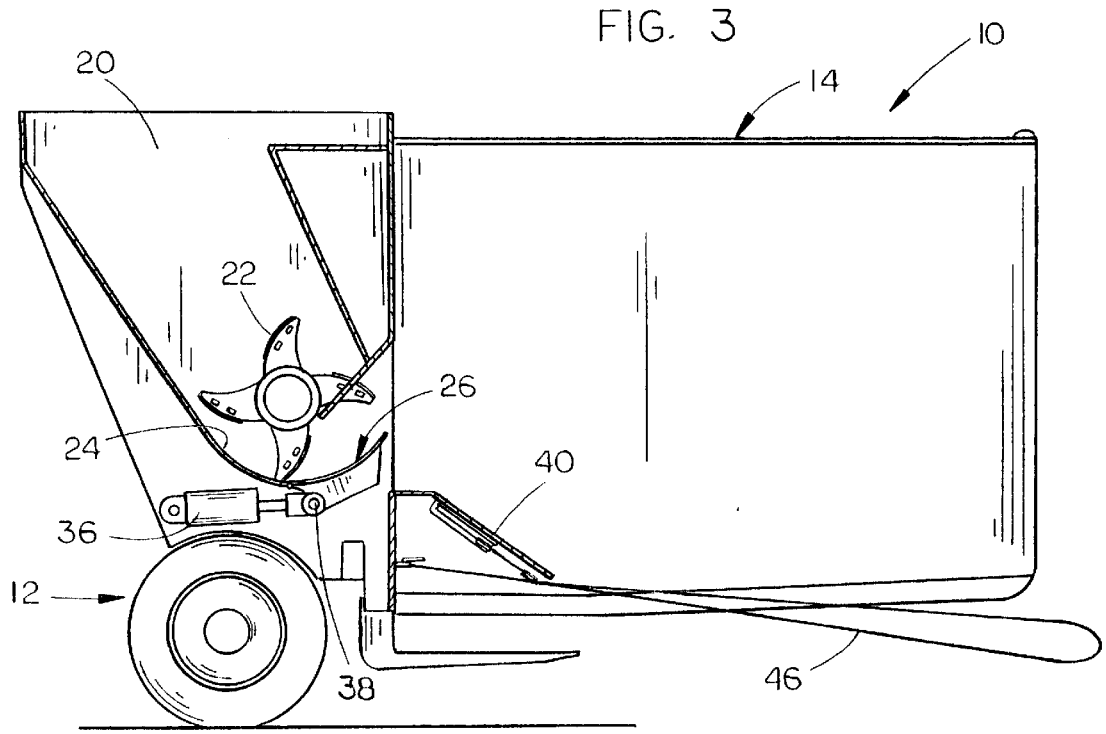
FIG. 4 is a view similar to FIG. 3 except that the beveled press plate is in a raised position.

For purposes of description, frame 12 includes a floor 24 located beneath rotor 22 and which extends rearwardly therefrom. The numeral 26 refers to a vertically adjustable, beveled press plate positioned on the rearward end of the floor 24, as seen in the drawings. Press plate 26 has opposite ends 28 and 30. Press plate 26 also includes front wall portions 32 and 34. As seen in the drawings, front wall portion 32 is angled with respect to the direction of flow of material as is front wall portion 34. Front wall portion 32 extends upwardly and outwardly as does front wall portion 34 when the press plate 26 is in its raised position of FIGS. 1 and 4. The preferred embodiment of the press plate 26 is that it be beveled. However, the beveled configuration may be omitted in some situations, if so desired. Thus, the material being bagged, upon being forced by the rotor into engagement with the beveled press plate 26, will be moved upwardly, outwardly and rearwardly with respect to the center line of the beveled press plate 26. Hydraulic cylinder 36 is connected to press plate 26 to pivot press plate 26 about pivot connection 38 between the lowered position of FIGS. 2 and 3 and the raised position of FIGS. 1 and 4.

Figure 2:
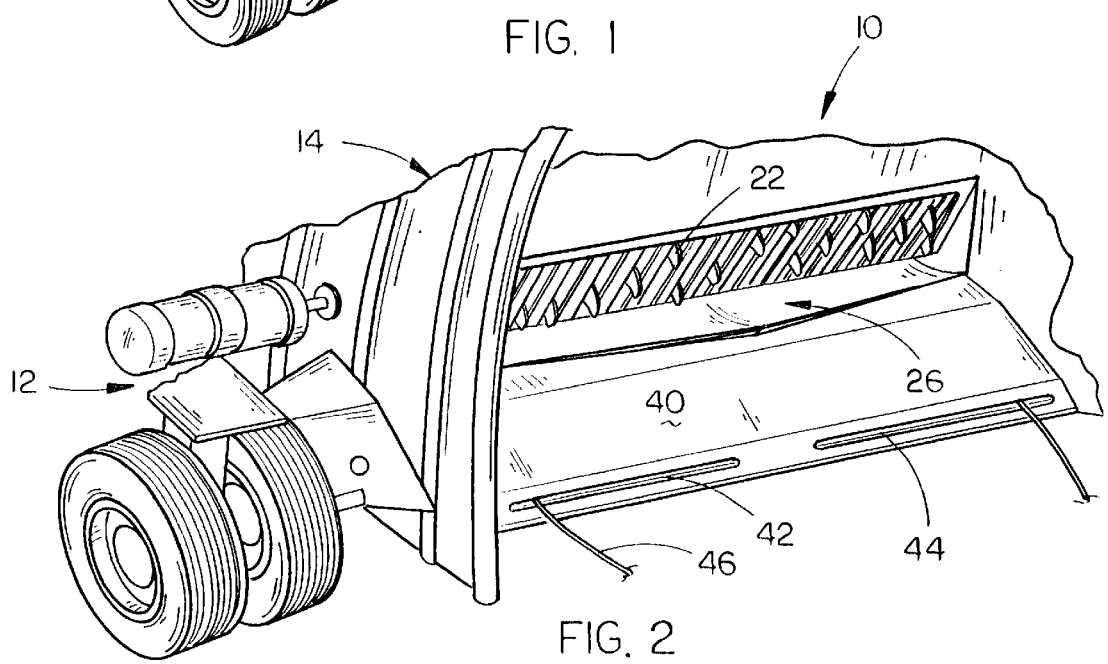
FIG. 2 is a view similar to FIG. 1 except that the beveled press plate is in its lowered position.

Tunnel 14 includes a floor 40 which extends rearwardly from beveled press plate 26 and thence downwardly and rearwardly therefrom. The lower rearward end of floor 40 includes a pair of elongated horizontally disposed slots 42 and 44, as best illustrated in FIGS. 1 and 2.

The numeral 46 refers to an adjustable density control cable such as disclosed in U.S. Pat. No. 5,671,594. The density control cable could also be of the type described in U.S. Pat. No. 5,425,220. Although it is preferred that the adjustable, beveled press plate of this invention be utilized with some form of density control cable, the press plate will function without a density control cable or cables.

The operator of the machine can bag almost any type of material by simply setting the beveled press plate 26 to the height that provides the most adjustment for that particular type of material. The adjustable, beveled press plate also provides a benefit if the operator has set the machine too tight (cable loop too wide). In such a situation, the engine of the machine may stall. With the press plate of this invention, the operator can lower the press plate 26 to relieve the load against the rotor 22. This enables the operator to start the engine without having to prematurely release the density control cable.

A further benefit of the adjustable, beveled press plate of this invention is that the press plate may be selectively adjusted to help push heavily loaded unloading vehicles, i.e., walking floor semi-trailers, more consistently. The bagging machine pushes the vehicle while bagging its contents. On large vehicles and in soft ground, it is difficult to push the vehicle, which changes the pack (density) in the bag. When the vehicle is nearly unloaded, it is light and rolls much more easily, thereby again changing the pack in the bag. By adjusting the beveled press plate, the rotor push can be diverted upwardly when the unloading vehicle is light, and downwardly when the vehicle is heavy to push. The adjustable, beveled press plate enables the machine operator to have more control in packing the bags in all conditions.

Thus it can be seen that the invention accomplishes at least all of its stated objectives.

I claim:

1. An agricultural bagging machine for bagging agricultural material into an agricultural bag having a closed end and an open mouth, comprising: a frame having rearward and forward ends;

a tunnel on said frame having an intake end for receiving the material to be bagged and an output end adapted to receive the open mouth of the agricultural bag;

material receiving means on said frame forwardly of said tunnel for receiving the material to be bagged;

material conveying means at the intake end of said tunnel for forcing the material to be bagged from said material receiving means through said tunnel and into said bag;

and a density control means positioned in said tunnel for engagement with the material being bagged as the material is forced past said density control means and into said bag to control the density of the material;

said density control means comprising an elongated flexible cable at least partially positioned in said tunnel to define a first generally U-shaped cable loop having spaced-apart first and second leg portions joined by a base portion;

said leg portions having forward ends positioned forwardly of said base portion;

engagement means in engagement with said U-shaped cable loop to permit the spacing between said first and second leg portions to be selectively changed;

and an adjustable press plate positioned on said frame rearwardly of said material conveying means.

2. The bagging machine of claim 1 wherein said press plate is selectively vertically adjustable.

3. The bagging machine of claim 2 wherein a power cylinder is operatively connected to said press plate for selectively vertically adjusting said press plate.

4. The bagging machine of claim 1 wherein said press plate is elongated and has a longitudinal axis disposed transversely with respect to the flow of material through said tunnel, said press plate being centered with respect to said flow of material.

5. The bagging machine of claim 1 wherein said press plate is arcuate and beveled.

The bagging machine of claim 1 wherein said press plate is arcuate and beveled.

6. The bagging machine of claim 5 wherein said material conveying means comprises a horizontally disposed rotor.

7. The bagging machine of claim 6 wherein said frame includes a floor positioned beneath said rotor which extends rearwardly from said rotor and wherein said beveled press plate is positioned on said floor.

8. The bagging machine of claim 5 wherein said press plate includes opposite ends, and a front wall which extends upwardly and rearwardly into the path of the material being forced rearwardly by said rotor.

9. The bagging machine of claim 8 wherein said front wall of said press plate is arcuate.

10. The bagging machine of claim 8 wherein said press plate is beveled and wherein said front wall of said beveled press plate includes first and second wall portions which are angularly disposed with respect to each other, each of said wall portions being arcuate and extending upwardly, outwardly and rearwardly.

11. The bagging machine of claim 1 wherein said press plate is selectively movable between lowered and raised positions, said press plate, when in its said lowered position, permitting the material being bagged to flow thereover without exerting any influence thereon.

12. An agricultural bagging machine for bagging agricultural material into an agricultural bag having a closed end and an open mouth, comprising:

a frame having rearward and forward ends;

a tunnel on said frame having an intake end for receiving the material to be bagged and an output end adapted to receive the open mouth of the agricultural bag;

said tunnel having a top wall and opposite side walls;

material receiving means on said frame forwardly of said tunnel for receiving the material to be bagged;

material conveying means for forcing the material to be bagged from said material receiving means through said tunnel and into said bag;

and an adjustable press plate positioned in said tunnel rearwardly of said material conveying means.

13. The bagging machine of claim 12 wherein said press plate is selectively vertically adjustable.

14. The bagging machine of claim 13 wherein a power cylinder is operatively connected to said press plate for selectively vertically adjusting said press plate.

15. The bagging machine of claim 12 wherein said press plate is elongated and has a longitudinal axis disposed transversely with respect to the flow of material through said tunnel, said press plate being centered with respect to said flow of material.

16. The bagging machine of claim 12 wherein said press plate is beveled.

17. The bagging machine of claim 16 wherein said material conveying means comprises a horizontally disposed rotor.

18. The bagging machine of claim 17 wherein said frame includes a floor positioned beneath said rotor which extends rearwardly from said rotor and wherein said beveled press plate is positioned on said floor.

19. The bagging machine of claim 17 wherein said beveled press plate includes opposite ends, and a front wall which extends upwardly and rearwardly into the path of the material being forced rearwardly by said rotor.

20. The bagging machine of claim 19 wherein said front wall of said beveled press plate is arcuate.

21. The bagging machine of claim 19 wherein said front wall of said beveled press plate includes first and second wall portions which are angularly disposed with respect to each other, each of said wall portions being arcuate and extending upwardly, outwardly and rearwardly.

22. An agricultural bagging machine for bagging agricultural material into an agricultural bag having a closed end and an open mouth, comprising:

a frame having rearward and forward ends;

a tunnel on said frame having an intake end for receiving the material to be bagged and an output end adapted to receive the open mouth of the agricultural bag;

said tunnel having a top wall and opposite side walls;

a hopper on said frame forwardly of said tunnel for receiving the material to be bagged;

a horizontally disposed rotor at the intake end of said tunnel for forcing the material to be bagged from said hopper through said tunnel and into said bag;

and an elongated, adjustable, beveled press plate positioned on said frame rearwardly of said rotor;

and a density control means positioned between the side walls of said tunnel for engagement with the material being bagged as the material is forced past said density control means and into said bag to control the density of the material.

* * * * *